(12) United States Patent
Ono et al.

(10) Patent No.: US 10,385,178 B2
(45) Date of Patent: Aug. 20, 2019

(54) PROPYLENE-BASED RESIN FOAM PARTICLE AND FOAM PARTICLE MOLDED BODY

(71) Applicant: JSP Corporation, Tokyo (JP)

(72) Inventors: Michitoshi Ono, Utsunomiya (JP); Taizo Kitahara, Utsunomiya (JP); Kazuo Tsurugai, Utsunomiya (JP)

(73) Assignee: JSP Corporation, Tokyo (JP)

( * ) Notice: Subject to any disclaimer, the term of this patent is extended or adjusted under 35 U.S.C. 154(b) by 53 days.

(21) Appl. No.: 15/111,760

(22) PCT Filed: Dec. 24, 2014

(86) PCT No.: PCT/JP2014/084194
§ 371 (c)(1),
(2) Date: Jul. 14, 2016

(87) PCT Pub. No.: WO2015/107847
PCT Pub. Date: Jul. 23, 2015

(65) Prior Publication Data
US 2016/0333161 A1 Nov. 17, 2016

(30) Foreign Application Priority Data
Jan. 17, 2014 (JP) .................................. 2014-007059

(51) Int. Cl.
*C08J 9/16* (2006.01)
*C08J 9/22* (2006.01)
(Continued)

(52) U.S. Cl.
CPC . *C08J 9/16* (2013.01); *C08J 9/22* (2013.01); *C08J 9/0061* (2013.01); *C08J 9/232* (2013.01);
(Continued)

(58) Field of Classification Search
CPC .......................... C08J 9/16; C08J 2323/10–16
See application file for complete search history.

(56) References Cited

U.S. PATENT DOCUMENTS 9,230,710 B2   1/2016  Chiba et al.
2005/0113473 A1*  5/2005  Wada .................... C08J 9/16
                                                    521/143
(Continued)

FOREIGN PATENT DOCUMENTS

JP          10-77359 A      3/1998
JP        2001-162640 A     6/2001
(Continued)

OTHER PUBLICATIONS

Lieberman, R. and Stewart, C. 2004. Propylene Polymers. Encyclopedia of Polymer Science and Technology (Year: 2004).*
(Continued)

*Primary Examiner* — Michael M Dollinger
*Assistant Examiner* — Christina H. W. Rosebach
(74) *Attorney, Agent, or Firm* — Fitch, Even, Tabin & Flannery LLP

(57) ABSTRACT

The present invention is concerned with expanded propylene resin beads including a core layer being in a foamed state and constituted of a propylene-based resin composition (a) and a cover layer constituted of an olefin-based resin (b), the propylene-based resin composition (a) satisfying the following (i) and (ii), and the olefin-based resin (b) satisfying the following (iii) or (iv).

(i) A mixture of 75% by weight to 98% by weight of a propylene-based resin (a1) having a melting point of 100° C. to 140° C. and 25% by weight to 2% by weight of a propylene-based resin (a2) having a melting point of 140° C. to 165° C.

(ii) A difference between the melting point of the resin (a2) and the melting point of the resin (a1) is 15° C. or more.

(Continued)

13(iii) A crystalline olefin-based resin having a melting point TmB that is lower than a melting point TmA of the composition (a) and having a relation of $0°C < [TmA-TmB] \leq 80°C$.

(iv) A non-crystalline olefin-based resin having a softening point TsB that is lower than TmA and having a relation of $0°C < [TmA-TsB] \leq 100°C$.

18 Claims, 4 Drawing Sheets

(51) Int. Cl.
  C08J 9/00         (2006.01)
  C08J 9/232        (2006.01)
(52) U.S. Cl.
  CPC ...... C08J 2201/034 (2013.01); C08J 2203/06 (2013.01); C08J 2323/10 (2013.01); C08J 2323/14 (2013.01); C08J 2423/06 (2013.01); C08J 2423/14 (2013.01)

(56) References Cited

U.S. PATENT DOCUMENTS

| | | | |
|---|---|---|---|
| 2005/0164000 A1* | 7/2005 | Okuyama | B29C 44/445 428/403 |
| 2007/0208140 A1 | 9/2007 | Wada | |
| 2008/0039588 A1* | 2/2008 | Shibata | C08J 9/0061 525/240 |
| 2009/0169895 A1 | 7/2009 | Nohara et al. | |
| 2010/0105787 A1 | 4/2010 | Sasaki et al. | |
| 2011/0152412 A1 | 6/2011 | Hogt et al. | |
| 2013/0266792 A1 | 10/2013 | Nohara et al. | |
| 2015/0025162 A1 | 1/2015 | Sato et al. | |
| 2015/0158990 A1 | 6/2015 | Takagi et al. | |

FOREIGN PATENT DOCUMENTS

| | | |
|---|---|---|
| JP | 2004-68016 A | 3/2004 |
| JP | 2004-176047 A | 6/2004 |
| JP | 2005-139350 A | 6/2005 |
| JP | 2009-221258 A | 10/2009 |
| JP | 2011-16914 | 1/2011 |
| JP | 2011016914 A | 1/2011 |
| JP | 2012-126816 A | 7/2012 |
| WO | 2006/054727 A1 | 5/2006 |
| WO | 2009/001626 A1 | 12/2008 |
| WO | 2010/150466 A1 | 12/2010 |
| WO | 2012/081490 A1 | 6/2012 |
| WO | 2013/137411 A1 | 9/2013 |
| WO | 2015/107847 A1 | 7/2015 |
| WO | 2016/060162 A1 | 4/2016 |
| WO | 2016/111017 A1 | 7/2016 |

OTHER PUBLICATIONS

International Search Report dated Mar. 24, 2015 for PCT/JP2014/084194 and English translation of the same (4 pages).

Extended European Search Report dated Jul. 28, 2017, issued in corresponding European Patent Application No. 14879190.8. (7 pages).

* cited by examiner

PROPYLENE-BASED RESIN FOAM PARTICLE AND FOAM PARTICLE MOLDED BODY

CROSS-REFERENCE TO RELATED APPLICATIONS

This application is a U.S. national phase application filed under 35 U.S.C. § 371 of International Application PCT/JP2014/084194, filed on Dec. 24, 2014, designating the United States, which claims priority from Japanese Application Number 2014-007059, filed Jan. 17, 2014, which are hereby incorporated herein by reference in their entirety.

TECHNICAL FIELD

Surface 70, convention relates to expanded propylene resin beads and an expanded expanded propylene resin beads molded article.

BACKGROUND ART

Since expanded resin beads are excellent in lightness in weight, cushioning properties, and heat resistance and high in a degree of freedom of shape design with which three-dimensional molded articles are obtained by means of in-mold molding, they are utilized as a cushioning material, a container, a heat insulating material, a vibration-damping material, or the like in multipurpose fields inclusive of packaging fields, commodities for living, building and civil engineering materials, vehicle members, and the like. The expanded resin beads are roughly classified into those made of a styrene-based resin as a base material resin and those made of an olefin-based resin as a base material resin. Among them, the expanded resin beads made of a styrene-based resin as a base material resin are used more frequently than the expanded resin beads made of an olefin-based resin as a base material resin for the reasons that the former is excellent in a balance between lightness in weight and compression strength, is easy for in-mold molding, and is inexpensive. But, though the expanded beads made of a styrene-based resin have an excellent aspect as described above, they are insufficient in heat resistance, chemical resistance, durability, toughness, and creep resistance characteristic depending upon uses.

For that reason, among the olefin-based resins, the expanded beads made of a propylene-based resin, which are excellent in heat resistance, chemical resistance, durability, toughness, creep resistance characteristic, and so on, are watched. But, with respect to in-mold molding using expanded propylene resin beads, there is involved difficulty in the aspect of molding processing, for example, a molding pressure of a heating medium, such as steam, etc., is high due to crystallinity or heat resistance of the propylene-based resin, and hence, an improvement is required.

For example, PTL 1 describes that in order to utilize fusion characteristics by a propylene-based resin having a low melting point, thereby decreasing a molding pressure of steam at the time of in-mold molding, while revealing appearance, heat resistance, and mechanical physical properties of a propylene-based resin having a high melting point, the propylene-based resin having a high melting point and the propylene-based resin having a low melting point are mixed under specified conditions.

In addition, for example, PTLs 2 and 3 disclose that in order to decrease a molding pressure of steam at the time of in-mold molding of expanded propylene resin beads, expanded propylene resin beads in which a core layer thereof is covered with a resin having a low melting point are used.

CITATION LIST

Patent Literature

PTL 1: WO 2009/001626A
PTL 2: JP 2004-68016A
PTL 3: JP 10-77359A

SUMMARY OF INVENTION

In accordance with the expanded propylene resin beads described in PTL 1, by mixing the propylene-based resin having a high melting point and the propylene-based resin having a low melting point under specified conditions, an effect for decreasing a pressure of the heating medium at the time of in-mold molding while keeping the excellent characteristics of the propylene-based resin is obtained to some extent; however, in the foregoing expanded beads, fusion bonding properties at low temperatures and heat resistance of the propylene-based resin are in a trade-off relationship, so that there was still room for improvement. In addition, in accordance with the expanded propylene resin beads covered with a low melting point resin as described in PTLs 2 and 3, it was possible to decrease a pressure of the heating medium at the time of in-mold molding; however, it may not be said that secondary expandability of the expanded beads at the time of in-mold molding under in-mold molding conditions under which the pressure of the heating medium is low is sufficient. In consequence, in the expanded propylene resin beads as described in PTLs 2 and 3, spaces which are called voids may possibly appear among the expanded beads constituting an expanded beads molded article in terms of an appearance of the molded article, so that there remained room for improvement in the secondary expandability of the expanded resin beads.

An object of the present invention is to provide expanded propylene resin beads which enable in-mold molding to achieve at a low pressure of a heating medium and which are excellent in fusion bonding properties and secondary expandability; and an expanded propylene resin beads molded article which is suppressed from the formation of voids and which is excellent in an appearance, such as surface smoothness, etc., and fusion bonding properties among the expanded beads.

Specifically, the present invention is as follows.
<1> Expanded propylene resin beads including a core layer being in a foamed state and constituted of a propylene-based resin composition (a) and a cover layer constituted of an olefin-based resin (b) that is located on the outer side of the core layer,
the propylene-based resin composition (a) satisfying the following (i) and (ii), and the olefin-based resin (b) satisfying the following (iii) or (iv):
(i) the propylene-based resin composition (a) is a mixture of 75% by weight to 98% by weight of a propylene-based resin (a1) having a melting point of 100° C. to 140° C. and 25% by weight to 2% by weight of a propylene-based resin (a2) having a melting point of 140° C. to 165° C., provided that a sum total of the propylene-based resin (a1) and the propylene-based resin (a2) is 100% by weight;
(ii) a difference between the melting point of the propylene-based resin (a2) and the melting point of the propylene-based resin (a1) [(melting point of a2)−(melting point of a1)] is 15° C. or more;

(iii) the olefin-based resin (b) is a crystalline olefin-based resin having a melting point (TmB) that is lower than a melting point (TmA) of the propylene-based resin composition (a), with a difference between the melting point (TmA) and the melting point (TmB) [TmA−TmB] being more than 0° C. and 80° C. or less; and (iv) the olefin-based resin (b) is a non-crystalline olefin-based resin having a softening point (TsB) that is lower than the melting point (TmA) of the propylene-based resin composition (a), with a difference between the melting point (TmA) and the softening point (TsB) [TmA−TsB] being more than 0° C. and 100° C. or less.

<2> The expanded propylene resin beads as set forth in <1>, wherein in a first time DSC curve obtained by the heat flux differential scanning calorimetry when heated from ambient temperature to 200° C. at a heating rate of 2° C./min, the expanded propylene resin beads show a main endothermic peak in which a peak top temperature of the endothermic peak is 100° C. to 140° C. and one endothermic peak on the high temperature side of the main endothermic peak appear, and the main endothermic peak calorific value of 70% to 95% relative to a total endothermic peak calorific value.

<3> The expanded propylene resin beads as set forth in <1> or <2>, wherein in the item (ii), the difference in melting point between the propylene-based resin (a2) and the propylene-based resin (a1) [(melting point of a2)−(melting point of a1)] is 15 to 25° C.

<4> The expanded propylene resin beads as set forth in any one of <1> to <3>, wherein the propylene-based resin (a1) or the propylene-based resin (a1) and the propylene-based resin (a2) are a propylene-based resin obtained through polymerization in the presence of a metallocene-based polymerization catalyst.

<5> The expanded propylene resin beads as set forth in any one of <1> to <3>, wherein the propylene-based resin (a1) is a propylene-based random copolymer obtained through polymerization in the presence of a metallocene-based polymerization catalyst, and the propylene-based resin (a2) is a propylene-based copolymer.

<6> The expanded propylene resin beads as set forth in any one of <1> to <5>, wherein the propylene-based resin composition (a) has a flexural modulus of 800 MPa to 1,200 MPa.

<7> The expanded propylene resin beads as set forth in any one of <1> to <6>, wherein the propylene-based resin composition (a) has a content of the propylene-based resin (a1) of more than 90% by weight and 98% by weight or less and a content of the propylene-based resin (a2) of 2% by weight or more and less than 10% by weight.

<8> The expanded propylene resin beads as set forth in any one of <1> to <7>, wherein the olefin-based resin (b) is a propylene-based resin obtained through polymerization in the presence of a metallocene-based polymerization catalyst.

<9> The expanded propylene resin beads as set forth in any one of <1> to <7>, wherein the olefin-based resin (b) is an ethylene-based resin obtained through polymerization in the presence of a metallocene-based polymerization catalyst.

<10> An expanded propylene resin beads molded article obtained through in-mold molding of the expanded propylene resin beads as set forth in any one of <1> to <9>.

In accordance with the present invention, in propylene resin foam having excellent heat resistance, chemical resistance, durability, toughness, and creep resistance characteristic, it is possible to provide expanded propylene resin foam beads which enable in-mold molding to achieve at a low pressure of a heating medium and which are excellent in fusion bonding properties and secondary expandability; and a favorable expanded propylene resin beads molded foamed article which is suppressed from the formation of voids and which is excellent in an appearance, such as surface smoothness, etc., and fusion bonding properties among the expanded beads.

DESCRIPTION OF EMBODIMENTS

Figure 1:
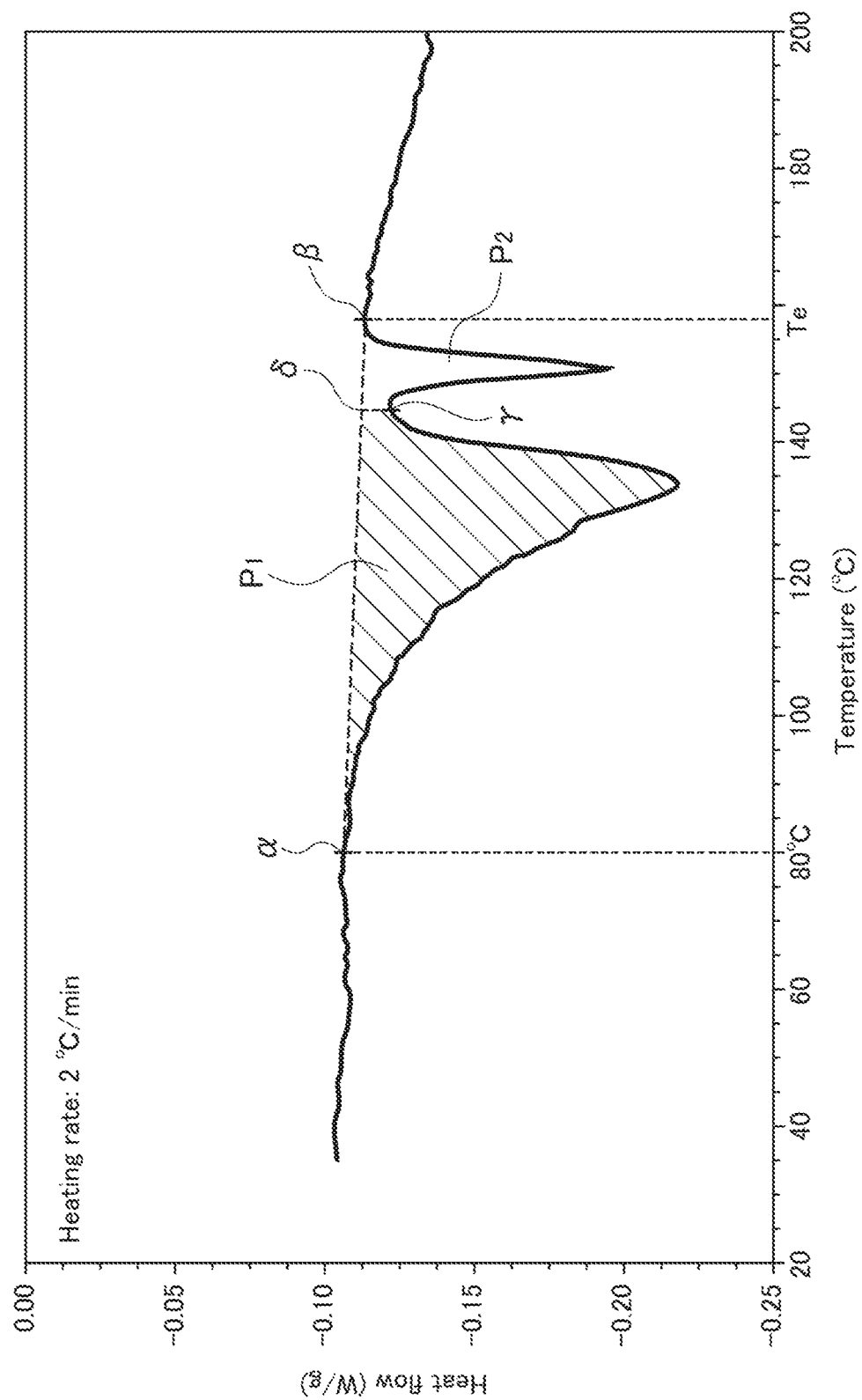
FIG. 1 is a first time DSC curve obtained by the heat flux differential scanning calorimetry by using expanded propylene resin beads of Example 1 of the present invention as a measurement sample and heating under a condition at a heating rate of 2° C./min.

The expanded propylene resin bead includes a core layer being in a foamed state and constituted of a propylene-based resin composition (a) and a cover layer constituted of an olefin-based resin (b) that covers the core layer. The propylene-based resin composition (a) satisfies the following (i) and (ii), and the olefin-based resin (b) satisfies the following (iii) or (iv):

(i) the propylene-based resin composition (a) is a mixture of 75% by weight to 98% by weight of a propylene-based resin (a1) having a melting point of 100° C. to 140° C. and 25% by weight to 2% by weight of a propylene-based resin (a2) having a melting point of 140° C. to 165° C., provided that a sum total of the propylene-based resin (a1) and the propylene-based resin (a2) is 100% by weight;

(ii) a difference between the melting point of the propylene-based resin (a2) and the melting point of the propylene-based resin (a1) [(melting point of a2)−(melting point of a1)] is 15° C. or more;

(iii) the olefin-based resin (b) is a crystalline olefin-based resin having a melting point (TmB) that is lower than a melting point (TmA) of the propylene-based resin composition (a), with a difference between the melting point (TmA) and the melting point (TmB) [TmA−TmB] being more than 0° C. and 80° C. or less; and (iv) the olefin-based resin (b) is a non-crystalline olefin-based resin having a softening point (TsB) that is lower than the melting point (TmA) of the propylene-based resin composition (a), with a difference between the melting point (TmA) and the softening point (TsB) [TmA−TsB] being more than 0° C. and 100° C. or less.

In addition, the expanded propylene resin beads molded article of the present invention is one obtained through in-mold molding of the expanded propylene resin beads of the present invention.

The following expressions are hereinafter sometimes abbreviated as follows.

Expanded propylene resin beads: expanded beads
Propylene-based resin composition (a): resin composition (a)
Propylene-based resin (a1): resin (a1)
Propylene-based resin (a2): resin (a2)
Olefin-based resin (b): resin (b)
Melting point of propylene-based resin (a1): $Tm_{a1}$
Melting point of propylene-based resin (a2): $Tm_{a2}$
Difference in melting point between propylene-based resin (a2) and propylene-based resin (a1) [$Tm_{a2}$–$Tm_{a1}$]: $\Delta Tm_{a2-1}$
Difference between melting point (TmA) of propylene-based resin composition (a) and melting point (TmB) of olefin-based resin (b) [TmA–TmB]: $\Delta Tm_{A-B}$
Difference between melting point (TmA) of propylene-based resin composition (a) and softening point (TsB) of olefin-based resin (b) [TmA–TsB]: $\Delta T_{mA-sB}$
Expanded propylene resin beads molded article: expanded beads molded article As for the reasons why the expanded beads of the present invention satisfying the aforementioned constituent features provide the expanded beads which are excellent in both fusion bonding properties and secondary expandability and exhibit sufficient mechanical physical properties, such as compression strength, etc., and the molded expanded beads molded article which exhibits sufficient mechanical physical properties and excellent fusion bonding properties among the expanded beads and appearance, even by means of in-mold molding under a condition at a low pressure of a heating medium, the following reasons may be conjectured.

First, the expanded beads of the present invention include a core layer and a cover layer. The melting point (TmB) or softening point (TsB) of the olefin-based resin (b) constituting the cover layer is lower than the melting point (TmA) of the propylene-based resin composition (a) constituting the core layer. In consequence, when the expanded beads molded article is produced using the expanded beads, the olefin-based resin (b) works as an adhesive for fusion bonding the expanded beads to each other, and the expanded beads molded article is excellent in fusion bonding properties among the expanded beads even at the time of in-mold molding under a condition at a low pressure of the heating medium. Second, the core layer includes as main components at least two propylene-based resins (a1 and a2) having a different melting point from each other, and of the resin (a1) and the resin (a2), the low melting point resin (a1) is contained in a larger content than the high melting point resin (a2) within a specified range, and hence, it may be considered that in the expanded beads including the resin (a2) with high mechanical strength, the secondary expandability of the expanded beads at the time of in-mold molding under a condition at a low pressure of the heating medium can be ensured. That is, according to the aforementioned first and second constituent features, it is possible to distinctly adjust the behaviors of the fusion bonding properties and the secondary expandability of the expanded beads, which are important in the in-mold molding, by resin compositions of the core layer and the cover layer, whereby in the propylene-based resin composition (a) including the resin (a2) with high mechanical strength in the core layer, the favorable secondary expandability of the expanded beads at the time of in-mold molding under a condition at a low pressure of the heating medium can be ensured. Furthermore, in view of the fact that the expanded beads are excellent in secondary expandability, in addition to effects that the spaces among the expanded beads are liable to be filled up at the time of in-mold molding, the generation of voids can be suppressed, and the expanded beads molded article with an excellent appearance can be obtained, the fusion bonding properties among the expanded beads become firmer.

In conventional expanded beads obtained by mixing a high melting point propylene-based resin and a low melting point propylene-based resin, the behaviors of the fusion bonding properties and the secondary expandability could not be distinctly adjusted. Therefore, expanded beads in which it is made possible to perform in-mold molding under a condition at a low pressure of the heating medium while scarifying the high mechanical physical properties of the expanded beads, or conversely the high mechanical physical properties are brought while scarifying the in-mold molding under a condition at a low pressure of the heating medium must be obtained, so that it was not fulfilled to fully bring out the both performances. In addition, the conventional expanded beads including a core layer and a cover layer are not ones in which the core layer is made of a composition including the resin (a1) and the resin (a2) in specified ranges as in the present invention, and there was involved such a problem that the secondary expandability of expanded beads in in-mold molding under a condition at a low pressure of the heating medium is insufficient as described above.

The expanded beads of the present invention and the expanded beads molded article of the present invention are hereunder described in detail.

<Propylene-based Resin Expanded Beads>

Figure 4:
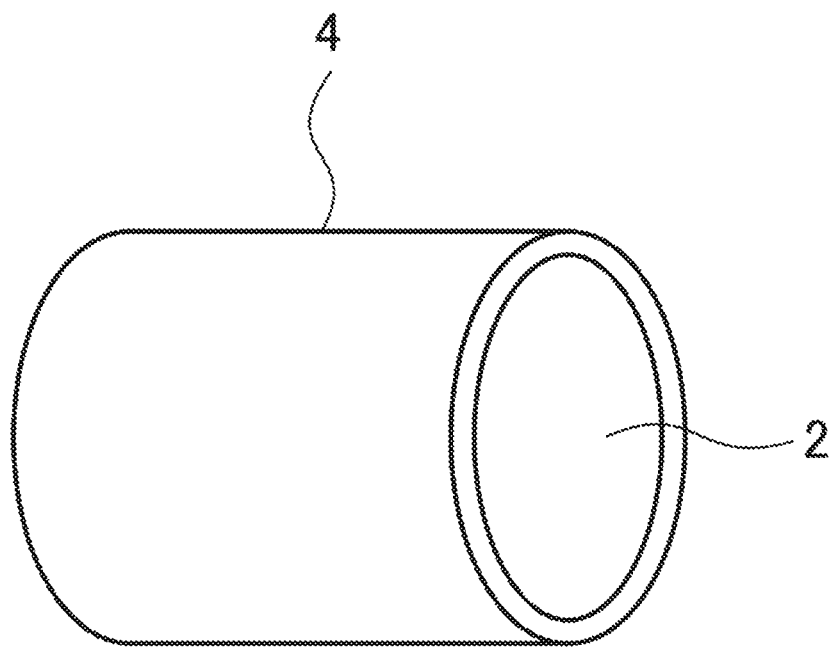
FIG. 4 is an example of expanded propylene resin beads of the present invention including a core layer being in a foamed state and constituted of a propylene-based resin composition and a cover layer constituted of an olefin-based resin that covers the core layer.

An example of the expanded propylene resin beads of the present invention is shown in FIG. 4.

As shown in FIG. 4 as a specific example, the expanded propylene resin beads of the present invention include a core layer 2 and a cover layer 4 that covers the core layer 2.

So far as the purpose and effects of the present invention can be achieved, each of the expanded beads may include, for example, an interlayer between the core layer and the cover layer; however, it is preferred to adjust a thickness of the cover layer thin for the reasons as described later, and hence, it is preferred that the expanded beads include simply the core layer and the cover layer. The cover layer that covers the core layer may cover the entirety of the periphery of the core layer, or for example, the cover layer may cover the core layer in a striped pattern.

The core layer includes the propylene-based resin composition (a) and is formed in a foamed state. Here, the foamed state refers to the matter that the core layer has a cell structure and means a cell structure that sufficiently contributes to lightness in weight such that the expanded and foamed beads have a general apparent density as described later. It may be confirmed whether or not the core layer is in a foamed state by a cross-sectional photograph of the expanded beads.

Meanwhile, though the cover layer that covers the core layer may be either in a foamed state or not in a foamed state, it is preferably in a non-foamed state. When the cover layer is in a non-foamed state, an unnecessary lowering of the strength of an expanded beads molded article can be suppressed. Here, the non-foamed state includes not only the state where cells are not present in the layer at all (also including the state where once formed cells are melt fractured, and the cells vanish) but also the case of a substantially non-foamed state where extremely fine cells are present in a slight amount.

[Propylene-based Resin Composition (a)]

As for the propylene-based resin composition (a), (i) it is constituted of 75% by weight to 98% by weight of a propylene-based resin (a1) having a melting point of 100° C. to 140° C. and 25% by weight to 2% by weight of a propylene-based resin (a2) having a melting point of 140° C. to 165° C., provided that a sum total of the propylene-based resin (a1) and the propylene-based resin (a2) is 100% by weight; and (ii) a difference in melting point between the propylene-based resin (a2) and the propylene-based resin (a1) [(melting point of a2)–(melting point of a1)] is 15° C. or more.

Namely, the propylene-based resin composition (a) includes at least the low melting point resin (a1) and the high melting point resin (a2); and the content of the resin (a1) is 75% by weight to 98% by weight, and the content of the resin (a2) is 25% by weight to 2% by weight in 100% by weight of the sum total of the resin (a1) and the resin (a2). A melting point $Tm_{a1}$ of the resin (a1) is in a relation of (100° C.≤$Tm_{a1}$≤140° C.), a melting point $Tm_{a2}$ of the resin (a2) is in a relation of (140° C.≤$Tm_{a2}$≤165° C.), and a difference in melting point therebetween ($\Delta Tm_{a2-1}$) is in a relation of (15° C.≤$\Delta Tm_{a2-1}$).

So far as the content of resin (a1) on the low melting point side is 75% by weight to 98% by weight in 100% by weight of the sum total of the resin (a1) and the resin (a2), the secondary expandability of the expanded beads at the time of in-mold molding under a condition of a low pressure of the heating medium in the expanded beads with relatively high mechanical strength is enhanced. Furthermore, according to this effect for enhancing the secondary expandability, in cooperation with the presence of the specified cover layer, the fusion bonding properties of the expanded beads become much more favorable. The resulting expanded beads molded article exhibits sufficient mechanical strength and is excellent in appearance and fusion bonding properties among the expanded beads.

The content of the resin (a1) is preferably 80% by weight to 98% by weight, more preferably 85% by weight to 98% by weight, and especially preferably more than 90% by weight and 98% by weight or less.

The content of the resin (a2) is preferably 2% by weight to 20% by weight, more preferably 2% by weight to 15% by weight, and especially preferably 2% by weight or more and less than 10% by weight.

The propylene-based resin as referred to in the present specification refers to a resin including a propylene-derived constituent unit as a main constituent unit. The main constituent unit as referred to herein means a constituent unit whose content in the polymer is more than 50% by weight, and preferably more than 80% by weight. The propylene-based resin composition as referred to in the present specification refers to a resin made of, as a main component, a resin including the propylene-based resin (a1) and the propylene-based resin (a2). The main component as referred to herein means that its content in the resin composition is more than 50% by weight, and preferably more than 80% by weight.

In the present invention, when the melting point $Tm_{a1}$ of the low melting point resin (a1) is in a relation of (100° C.≤$Tm_{a1}$≤140° C.), and a specified blending ratio of the resin (a1) and the resin (a2) in the present invention and a specified relation of a difference in melting point between the resin (a1) and the resin (a2) are satisfied at the same time, effects, such as an enhancement in secondary expandability of the expanded beads, etc., are obtained. The $Tm_{a1}$ is in a relation of preferably (110° C.≤$Tm_{a1}$≤140° C.), more preferably (120° C.≤$Tm_{a1}$≤140° C.), still more preferably (125° C.≤$Tm_{a1}$<140° C.), and especially preferably (130° C.≤$Tm_{a1}$<140° C.).

When the melting point $Tm_{a2}$ of the resin (a2) on the high melting point side is in a relation of (140° C.≤$Tm_{a2}$≤165° C.), and a specified blending ratio of the resin (a1) and the resin (a2) in the present invention and a specified relation of a difference in melting point between the resin (a1) and the resin (a2) are satisfied at the same time, the effects, such as an enhancement of mechanical physical properties of the expanded beads, in its turn the resulting expanded beads molded article, etc., are obtained. The $Tm_{a2}$ is in a relation of preferably (145° C.≤$Tm_{a2}$≤165° C.), more preferably (145° C.≤$Tm_{a2}$<165° C.), still more preferably (150° C.≤$Tm_{a2}$<165° C.), and especially preferably (150° C.≤$Tm_{a2}$≤160° C.).

The difference between the melting point of the propylene-based resin (a2) and the melting point of the propylene-based resin (a1) [$Tm_{a2}-Tm_{a1}$]($\Delta Tm_{a2-1}$) is 15° C. or more. When the $\Delta Tm_{a2-1}$ is 15° C. or more, in cooperation with the conditions, such as the specified blending ratio of the resin (a1) and the resin (a2), etc., the desired purpose regarding the mechanical strength and secondary expandability of the expanded beads is attained. The $\Delta Tm_{a2-1}$ is preferably 15° C. to 30° C., more preferably 15° C. to 25° C., and especially preferably 15° C. to 23° C.

Figure 3:
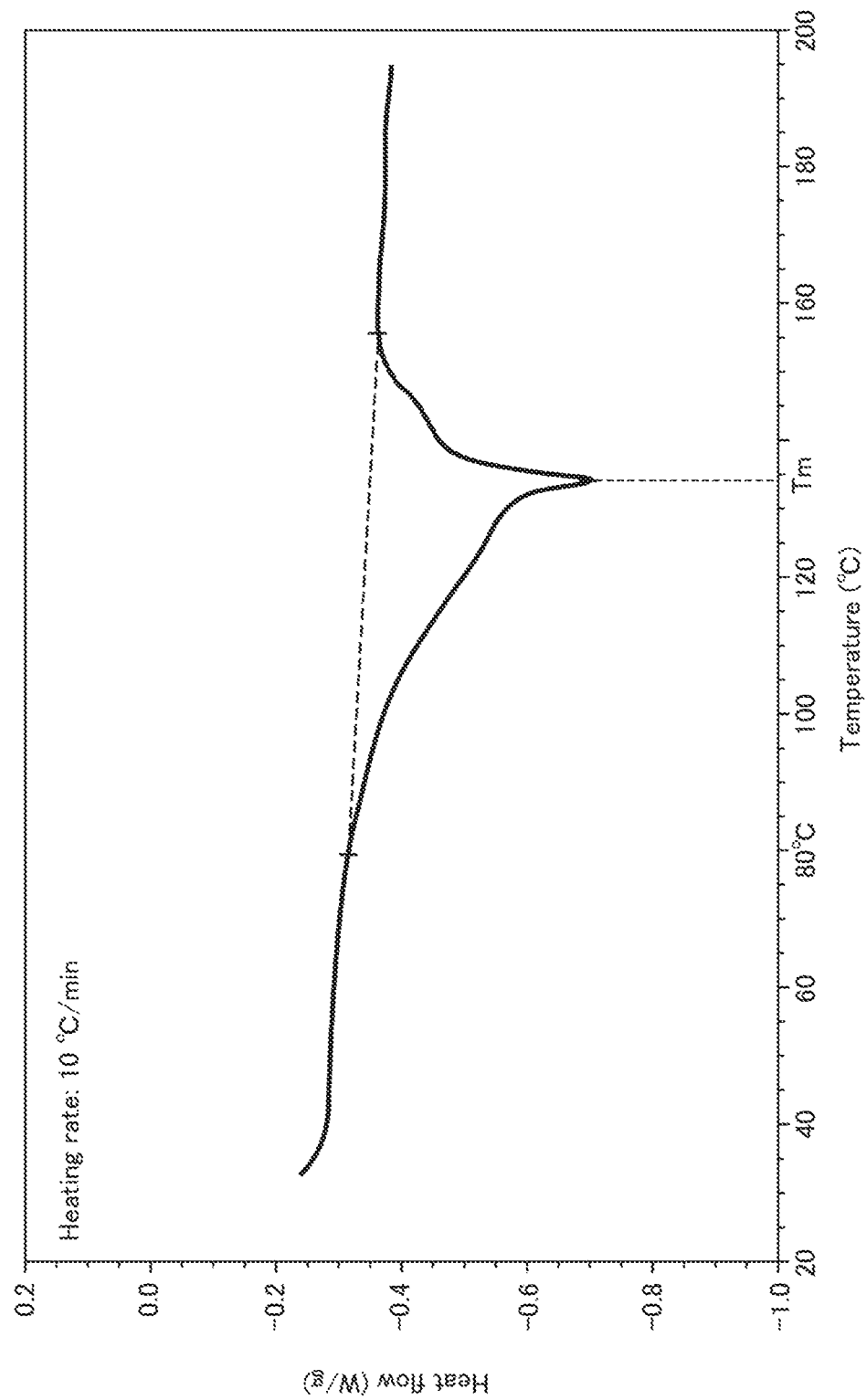
FIG. 3 is a second time DSC curve obtained by the heat flux differential scanning calorimetry by using expanded propylene resin beads of Example 1 of the present invention as a measurement sample and heating under a condition at a heating rate of 10° C./min.

The melting point of the resin is a value as measured under a condition at a heating rate of 10° C./min by the method described in "the case of measuring a fusion temperature after performing a certain heat treatment" in accordance with JIS K7121 (1987) by a heat flux differential scanning calorimetry (heat flux DSC) apparatus. Here, the "DSC curve obtained through measurement of a melting point by the heat flux differential scanning calorimetry after performing a certain heat treatment" is referred to as "second time DSC curve obtained by the heat flux differential canning calorimetry". An example of the second time DSC curve obtained by the heat flux differential canning calorimetry is shown in FIG. 3. In the expanded propylene resin beads of Example 1 of the present invention, the value expressed by Tm is the melting point of the resin in FIG. 3. In the case where plural endothermic peaks are present in the DSC curve, a peak top temperature of the endothermic peak having a largest area is defined as the melting point.

MFR of the resin (a1) is preferably 1 g/10 min to 100 g/10 min, and more preferably 2 g/10 min to 50 g/10 min.

MFR of the resin (a2) is preferably 0.1 g/10 min to 50 g/10 min, and more preferably 0.2 g/10 min to 20 g/10 min.

The MFR of each of the propylene-based resin and the propylene-based resin composition is a value as measured under the test condition M (temperature: 230° C., load: 2.16 kg) in accordance with JIS K7210 (1999). The MFR of the ethylene-based resin is a value as measured under the test condition D (temperature: 190° C., load: 2.16 kg) in accordance with JIS K7210 (1999).

So far as the resin (a1) and the resin (a2) are a propylene-based resin satisfying the aforementioned conditions (i) and (ii), each of the resin (a1) and the resin (a2) may be either a propylene homopolymer or a propylene-based copolymer including a propylene-derived constituent unit and other constituent unit. Here, the propylene-based copolymer contains the propylene-derived constituent unit in a content of preferably 70% by weight or more, and more preferably 80% by weight to 99.5% by weight in the copolymer.

The melting point of the resin is controlled by selection of the catalyst species in synthesis of the resin, selection of the copolymer component, adjustment of the content of the copolymer component, adjustment of a degree of crystallization, and so on; however, the selection of the resin (a1) and the resin (a2) may be made by reference to melting points described in brochures of propylene-based resins marketed by raw material manufacturers, or the like. The resin (a1) may be easily selected from a propylene-based copolymer obtained by a metallocene-based polymerization catalyst.

The propylene-based copolymer includes a copolymer of propylene and ethylene or/and an α-olefin having 4 to 20 carbon atoms, and examples thereof include copolymers of propylene and at least one comonomer selected from ethylene, 1-butene, 1-pentene, 1-hexene, 1-octene, 4-methyl-1-butene, 4-methyl-1-pentene, and the like. The aforementioned propylene-based copolymer may also be a binary copolymer, such as a propylene-ethylene random copolymer, a propylene-1-butene random copolymer, etc., or a ternary copolymer, such as a propylene-ethylene-butene random terpolymer, etc.

A total content of the comonomer components, such as ethylene or/and an α-olefin having 4 to 20 carbon atoms, etc., is preferably 30% by weight or less, and more preferably 0.01% by weight to 20% by weight in the propylene-based copolymer.

From the viewpoints of adjusting the secondary expandability, the mechanical physical properties, and so on of the expanded beads according to the desired purpose, the resin (a1) is preferably a random copolymer of propylene and ethylene or/and 1-butene. In consequence, preferred specific examples of the resin (a1) include a propylene-ethylene random copolymer, a propylene-1-butene random copolymer, a propylene-ethylene-1-butene random terpolymer, and the like.

In the case where the resin (a1) is a propylene-based copolymer, from the viewpoints of melting point and mechanical physical properties, a total content of the comonomer components in the resin (a1) is selected within the range of preferably from 0.1% by weight to 15% by weight, and more preferably from 0.3% by weight to 10% by weight.

Furthermore, as the resin (a1), a propylene-ethylene random copolymer, a propylene-1-butene random copolymer, and a propylene-ethylene-1-butene random terpolymer, each of which is, for example, obtained through copolymerization of propylene and a comonomer using a metallocene-based polymerization catalyst, are more preferred from the viewpoint of obtaining the resin with a low melting point without greatly lowering the mechanical physical properties. The resin (a1) which is obtained using a metallocene-based polymerization catalyst is especially preferred from the viewpoints that it is excellent in compatibility with the resin (a2) and that the lowering in mechanical physical properties of the resin composition (a) is suppressed.

The resin (a2) may be easily selected among general-purpose propylene-based resins. Examples thereof include a propylene homopolymer, a block copolymer of propylene and ethylene or/and an α-olefin having 4 to 20 carbon atoms, and a random copolymer of propylene and ethylene or/and an α-olefin having 4 to 20 carbon atoms in which a total content of the comonomer components is preferably 0.01% by weight to 10% by weight, and more preferably 0.05% by weight to 5% by weight. The resin (a2) is preferably a propylene-based copolymer, and more preferably a random copolymer of propylene and ethylene or/and 1-butene from the standpoints that it is excellent in compatibility with the resin (a1) and that an enhancement of mechanical physical properties or secondary expandability of the resulting expanded beads can be expected.

As the polymerization catalyst which is used in polymerizing the resin (a1) and the resin (a2), various organometallic complexes having a performance as the polymerization catalyst may be used.

In general, a Ziegler-Natta-based polymerization catalyst, a metallocene-based polymerization catalyst, and the like are used.

The Ziegler-Natta-based polymerization catalyst is an organometallic complex containing titanium, aluminum, magnesium, or the like as a nuclear element, which is partially or wholly modified with an alkyl group.

The metallocene-based polymerization catalyst (also called a homogenous catalyst) is an organometallic complex elemental material containing a transition metal, such as zirconium, titanium, thorium, ruthenium, lanthanum, iron, etc., or boron as a nuclear element, which is modified with a cyclopentane ring or the like.

As the polymerization catalyst, a combination of the aforementioned organometallic complex and a methyl aluminoxane, etc., or the like may also be used.

Among those, from the viewpoint of an enhancement in mechanical physical properties of the expanded beads molded article, the polymerization catalyst is preferably a metallocene-based polymerization catalyst, and a propylene-based resin obtained through polymerization of the resin (a1) or the resin (a1) and the resin (a2) in the presence of a metallocene-based polymerization catalyst is preferred.

When the resin (a1) and the resin (a2) are each a propylene-based copolymer, it is preferred that the resin (a1) is a propylene-based random copolymer obtained through polymerization in the presence of a metallocene-based polymerization catalyst, whereas the resin (a2) is a propylene-based copolymer. At that time, the resin (a2) may be a polymer obtained using a metallocene-based polymerization catalyst or may be a polymer obtained using a polymerization catalyst other than a metallocene-based polymerization catalyst.

[Heat Flux Differential Scanning Calorimetry of Expanded Propylene Resin Beads]

It is preferred that in a first time DSC curve obtained by the heat flux differential scanning calorimetry when heated from ambient temperature (approximately 25° C.) to 200° C. at a heating rate of 2° C./min, the expanded propylene resin beads of the present invention show a main endothermic peak (a shaded area in FIG. 1) in which a peak top temperature of the endothermic peak is 100° C. to 140° C. and one endothermic peak on the high temperature side of the main endothermic peak appear, and the main endothermic peak calorific value of 70% to 95% relative to a total endothermic peak calorific value.

According to the heat flux differential scanning calorimetry at a heating rate of 2° C./min, the accuracy of the calorific value analysis can be enhanced as compared with the case of calorimetry at a heating rate of 10° C./min. It may be considered that the obtained endothermic peak may be made an indicator of the compatible state between the resin (a1) and the resin (a2) of the core layer constituting the expanded beads. As described above, the expanded beads in which one endothermic peak appears on the high temperature side of the main endothermic peak are preferred from the viewpoint that the compatibility between the resin (a1) and the resin (a2) is favorable, so that the mechanical physical properties or secondary expandability of the resulting expanded beads is more enhanced.

Figure 2:
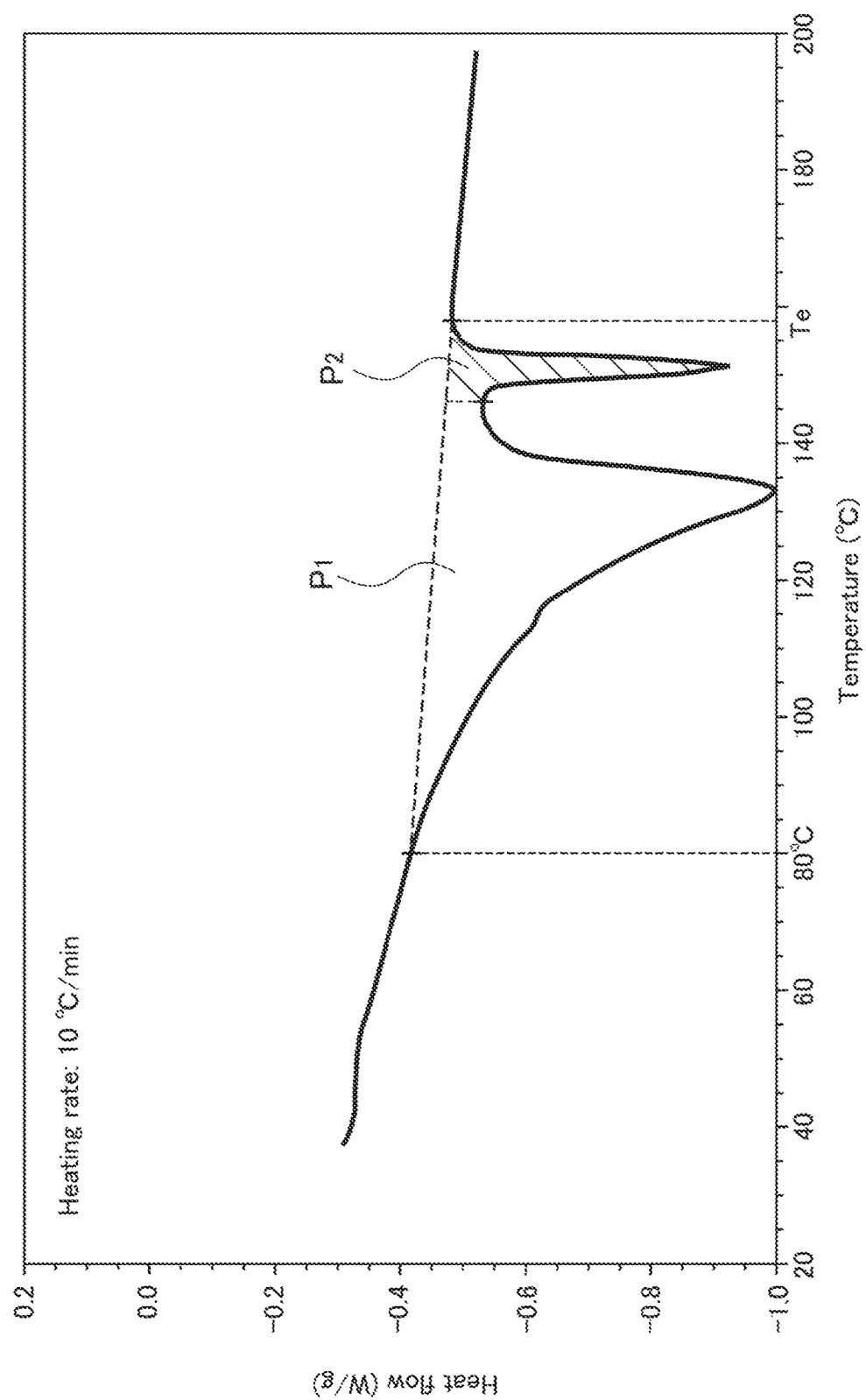
FIG. 2 is a first time DSC curve obtained by the heat flux differential scanning calorimetry by using expanded propylene resin beads of Example 1 of the present invention as a measurement sample and heating under a condition at a heating rate of 10° C./min.

In general, there is adopted a method in which the heat flux differential scanning calorimetry of the expanded propylene resin beads is performed according to the aforementioned procedures except for performing the measurement at a heating rate of 10° C./min, and the calorific value of endothermic peaks present on the high temperature side of the main endothermic peak determined by the measurement is adjusted, thereby controlling the secondary expandability at the time of in-mold molding and dimensional stability of the expanded beads molded article. It is preferred that in a first time DSC curve obtained by the heat flux differential scanning calorimetry when heated from ambient temperature (approximately 25° C.) to 200° C. at a heating rate of 10° C./min, the expanded propylene resin beads of the present invention show a main endothermic peak in which a peak top temperature of the endothermic peak is 100° C. to 140° C. and an endothermic peak on the high temperature side of the main endothermic peak appear, and the main endothermic peaks calorific value of 70% to 95% relative to a total endothermic peak calorific value. Furthermore, a sum total of calorific values (a shaded area of the peak expressed by P2 in FIG. 2) of all of endothermic peaks (hereinafter also referred to as high-temperature peaks) appearing on the high temperature side of the main endothermic peak is adjusted to preferably 5 to 20 J/g, and more preferably 8 to 18 J/g.

As a representative example, a first time DSC curve obtained when 1 to 3 mg of expanded propylene resin beads obtained in Example 1 of the present invention as described later is used as a sample, and the sample is heated from ambient temperature to 200° C. at a heating rate of 2° C./min by using a heat flux differential scanning calorimetry apparatus is shown in FIG. 1. In the DSC curve in FIG. 1, each of $P_1$ and $P_2$ expresses an endothermic peak.

The total endothermic peak calorific value (hereinafter sometimes referred to as "$\Delta H$") of the first time DSC curve in the present invention is determined in the following manner.

As shown in FIG. 1, a line segment ($\alpha$-$\beta$) extending between a point $\alpha$ corresponding to 80° C. on the DSC curve and a point $\beta$ corresponding to a melt completion temperature Te on the DSC curve is drawn and defined as a base line, and a calorific value corresponding to an area of a portion surrounded by the base line and the DSC curve is defined as the total endothermic peak calorific value ($\Delta H$) J/g. In the present invention, the total endothermic peak calorific value ($\Delta H$) is preferably in the range of from 40 J/g to 120 J/g, more preferably in the range of from 45 J/g to 100 J/g, and especially preferably in the range of from 45 J/g to 85 J/g.

In the expanded beads of the present invention, it is preferred that one endothermic peak appears on the high temperature side of the main endothermic peak on the first time DSC curve as shown in FIG. 1. The calorific value of the main endothermic peak or the like may be determined by a partial area analyzing method as explained below.

The partial area analyzing method is explained by reference to FIG. 1. A line segment ($\alpha$-$\beta$) extending between a point $\alpha$ corresponding to 80° C. on the DSC curve and a point $\beta$ corresponding to a melt completion temperature Te of the resin on the DSC curve is drawn. Subsequently, a straight line which is parallel to the ordinate of the graph is drawn from a point $\gamma$ on the DSC curve, which corresponds to a valley between a peak $P_1$ observed as a main endothermic peak having a largest area and a peak $P_2$ adjacent to the high temperature side of the peak $P_1$ (the valley between the low temperature side peak and the high temperature side peak), and a point intersecting with the line segment ($\alpha$-$\beta$) (a point of intersection between the straight line $\alpha$-$\beta$ and the perpendicular from $\gamma$) is defined as $\delta$.

The point $\gamma$ is determined as a point of a deepest portion of the valley among the points in the DSC curve between the peak $P_1$ and the peak $P_2$.

The line segment ($\delta$-$\gamma$) obtained by the aforementioned operation defines each peak boundary line in determining the area of the endothermic peak. The area of each peak corresponding to the calorific value of the endothermic peak is determined as an area surrounded by the DSC curve showing the peak $P_1$, the line segment ($\delta$-$\gamma$), and the line segment ($\alpha$-$\delta$) in the peak $P_1$ and as an area surrounded by the DSC curve showing the peak $P_2$, the line segment ($\delta$-$\gamma$), and the line segment ($\delta$-$\beta$) in the peak $P_2$, respectively. Then, the calorific value (J/g) of each peak is automatically computed by a differential scanning calorimeter on a basis of the above-determined area of each peak. In the aforementioned measurement method, the reason why in order to draw the line segment ($\alpha$-$\beta$) that is a base line, the point corresponding to 80° C. is used as the point $\alpha$ on the DSC curve resides in the matter that the present inventors have found that the base line in which the point corresponding to 80° C. is used as a start point, and the point corresponding to the melt completion temperature is used as an end point is suitable for determining the calorific value of the endothermic peak at high reproducibility in a stable manner.

While the partial area analyzing method has been explained by reference to the DSC curve (FIG. 1) obtained by the heat flux differential scanning calorimetry at a heating rate of 2° C./min, the calorific value of each of the endothermic peaks may also be measured in the same manner in a DSC curve (for example, the curve shown in FIG. 2) obtained by the heat flux differential scanning calorimetry at a heating rate of 10° C./min.

FIG. 3 is a second time DSC curve obtained by the heat flux differential scanning calorimetry by using expanded propylene resin beads of Example 1 of the present invention as a measurement sample and heating under a condition at a heating rate of 10° C./min.

A flexural modulus of the resin composition (a) is preferably 800 MPa to 1,200 MPa. So far as the flexural modulus of the resin composition (a) falls within the foregoing range, the strength of the expanded beads molded article obtained by molding the expanded beads can be increased.

The flexural modulus of the resin composition (a) is more preferably 850 MPa to 1,100 MPa, and still more preferably 900 MPa to 1,050 MPa.

The flexural modulus of the resin composition (a) may be determined upon preparation of a test piece (test piece size: 80 mm in length, 10 mm in width, 4 mm in thickness) by means of injection molding in accordance with JIS K7171 (2008).

The resin composition (a) constituting the core layer of the expanded beads of the present invention may further contain other resin components, additives, and the like within a range where the effects of the present invention are achieved. In consequence, the core layer constituted of the propylene-based resin composition (a) is not limited to one made of only the resin composition (a).

Examples of other resin components include ethylene-based resins, such as high density polyethylene, low density polyethylene, linear low density polyethylene, linear very low density polyethylene, an ethylene-vinyl acetate copolymer, an ethylene-acrylic acid copolymer, an ethylene-methacrylic acid copolymer, etc.; styrene-based resins, such as polystyrene, a styrene-maleic anhydride copolymer, etc.; rubbers, such as an ethylene-propylene-based rubber, an ethylene-1-butene rubber, a propylene-1-butene rubber, an ethylene-propylene-diene-based rubber, an isoprene rubber, a neoprene rubber, a nitrile rubber, etc.; thermoplastic elastomers, such as a styrene-butadiene-styrene block copolymer, a styrene-isoprene-styrene block copolymer, a hydrogenation product of a styrene-butadiene-styrene block copolymer, a hydrogenation product of a styrene-isoprene-styrene block copolymer, etc.; and the like.

These resins, rubbers, or elastomers may also be used in combination of two or more thereof. In the case where the resin composition (a) contains the aforementioned other resin components, a sum total of other resin components is adjusted to the content of preferably approximately 20 parts by weight or less, more preferably 15 parts by weight or less, and especially preferably 10 parts by weight or less based on 100 parts by weight in a sum total of the resin (a1) and the resin (a2).

Examples of the additive include various additives, such as a cell adjusting agent, e.g., zinc borate, etc., an antistatic agent, an electrical conductivity imparting agent, a lubricant, an antioxidant, a UV absorbing agent, a flame retardant, a metal-deactivator, a pigment, a dye, a nucleus agent, an inorganic filler, etc. These may be contained in the resin composition (a), if desired. The content of the additive varies with its addition purpose and is 25 parts by weight or less, preferably 15 parts by weight or less, more preferably 8 parts by weight or less, and most preferably 5 parts by weight or less based on 100 parts by weight of a sum total of the resin (a1) and the resin (a2).

Each of the resin (a1) and the resin (a2) is preferably a non-crosslinked propylene-based resin from the viewpoints of recyclability, productivity of the expanded beads, and so on.

The resin composition (a) may be, for example, obtained by charging a kneading machine with the resin (a1) and the resin (a2) as well as other resin components and additives which may be contained, if desired, followed by mixing.

At that time, it is preferred to perform the mixing such that the resin (a1) and the resin (a2) are thoroughly homogeneously mixed. In general, it is preferred to perform the mixing of the resin (a1) and the resin (a2) by heating at a temperature at which the both resins are melted and kneading the resultant by a kneader with high kneading properties, such as a twin-screw kneader, etc. It is preferred to knead the resins with an extruder by adopting a molding method in a starvation mode as described in, for example, JP 2006-69143A. It is preferred that after kneading the resin (a1) and the resin (a2), the kneaded material is laminated and combined with a molten material of the resin (b) as described later within a multilayer coextrusion die and coextruded in a string-like form, and the resultant is cut in a proper length, followed by granulation into resin beads having a suitable size while taking into consideration the size of the finally obtained expanded beads.

Next, the cover layer of the expanded beads is explained.

The cover layer is a layer that covers the core layer and is constituted of the olefin-based resin (b).

The olefin-based resin (b) satisfies the following (iii) or (iv).

That is, the olefin-based resin (b) is crystalline or non-crystalline.

When the olefin-based resin (b) is a crystalline olefin-based resin, (iii) the olefin-based resin (b) has a melting point (TmB) that is lower than a melting point (TmA) of the propylene-based resin composition (a), with a difference ($\Delta Tm_{A-B}$) between the melting point (TmA) and the melting point (TmB) [TmA−TmB] being more than 0° C. and 80° C. or less.

When the olefin-based resin (b) is a non-crystalline olefin-based resin, (iv) the olefin-based resin (b) has a softening point (TsB) that is lower than the melting point (TmA) of the propylene-based resin composition (a), with a difference between the melting point (TmA) and the softening point (TsB) [TmA−TsB] ($\Delta T_{mA-sB}$) being more than 0° C. and 100° C. or less.

The softening point (TsB) or melting point (TmB) of the resin (b) is lower than the melting point (TmA) of the resin composition (a), and hence, when performing in-mold molding using the expanded beads, the resin (b) is excellent in fusion bonding properties among the expanded beads.

In the case where the resin (b) is a crystalline olefin-based resin, when the ΔTmA-B is in a relation of (0° C.< $\Delta Tm_{A-B} \leq 80°$ C.), the resin (b) is excellent in fusion bonding properties among the expanded beads.

The ΔTmA-B is in a relation of preferably (5° C.≤ $\Delta Tm_{A-B} \leq 60°$ C.), more preferably (7° C.≤$\Delta Tm_{A-B} \leq 50°$ C.), and especially preferably (10° C.≤$\Delta Tm_{A-B} \leq 40°$ C.).

In the case where the resin (b) is a non-crystalline olefin-based resin, when $\Delta T_{mA-sB}$ is in a relation of (0° C.<$\Delta T_{mA-sB} \leq 100°$ C.), the resin (b) is excellent in fusion bonding properties among the expanded beads.

The $\Delta T_{mA-sB}$ is in a relation of preferably (10° C.≤$\Delta T_{mA-sB} \leq 80°$ C.), more preferably (15° C.≤$\Delta T_{mA-sB} \leq 75°$ C.), and especially preferably (20° C.≤$\Delta T_{mA-sB} \leq 70°$ C.).

[Olefin-based Resin (b)]

The olefin-based resin (b) as referred to in the present invention refers to a resin including a constituent unit derived from ethylene or an α-olefin, such as propylene, 1-butene, etc., as a main constituent unit. The main constituent unit as referred to herein means a constituent unit whose content in the polymer is more than 50% by weight, and preferably more than 80% by weight.

Examples thereof include (b1) a homopolymer of ethylene or an α-olefin, (b2) a copolymer of two or more monomer components selected from ethylene and an α-olefin, (b3) a copolymer including ethylene or/and an α-olefin and other monomer component, such as styrene, etc., and the like. The copolymer may be either a random copolymer or a block copolymer. When the resin (b) is a copolymer, a total content of constituent units derived from ethylene and an α-olefin in the copolymer is preferably 70% by weight or more, and more preferably 80% by weight or more.

Whether the resin (b) is crystalline or non-crystalline may be confirmed from a DSC curve obtained by using the resin (b) as a sample and performing the heat flux differential scanning calorimetry. When the resin (b) is crystalline, an endothermic peak appears on the DSC curve, whereas when the resin (b) is non-crystalline, an endothermic peak does not appear on the DSC curve.

Examples of the homopolymer (b1) of ethylene or an α-olefin include an ethylene resin, a propylene resin, a butene resin, and the like.

Examples of the copolymer (b2) of two or more components selected from ethylene and an α-olefin include a propylene-ethylene copolymer, a propylene-1-butene copolymer, a propylene-ethylene-1-butene terpolymer, an ethylene-1-pentene copolymer, an ethylene-1-hexene copolymer, an ethylene-4-methyl-1-pentene copolymer, and the like.

Examples of the copolymer (b3) including ethylene or/and an α-olefin and other monomer component, such as styrene, etc., include an ethylene-styrene copolymer, an ethylene-vinyl acetate copolymer, and the like.

In (b2), it is preferred that at least one of an ethylene-derived constituent unit and a propylene-derived constituent unit is contained. In (b3), the constituent unit derived from ethylene or/and an α-olefin is preferably an ethylene-derived constituent unit or/and a propylene-derived constituent unit.

The resin (b) may be polymerized by using a variety of polymerization catalysts. Examples of the polymerization catalyst include the Ziegler-Natta-based polymerization catalyst and the metallocene-based polymerization catalyst, each of which may be used for the synthesis of the resin (a1) and the resin (a2), and the like. Among the aforementioned polymerization catalysts, the metallocene-based polymerization catalyst is preferred from the viewpoint of the fact that a low melting point or low-softening point olefin-based resin with excellent fusion bonding properties is obtained.

The resin (b) is preferably a propylene-based resin obtained through polymerization in the presence of a metallocene-based polymerization catalyst from the viewpoints of especially excellent fusion bonding properties and mechanical strength of the expanded beads. Otherwise, the resin (b) is preferably an ethylene-based resin obtained through polymerization in the presence of a metallocene-based polymerization catalyst from the viewpoint of most excellent fusion bonding properties of the expanded beads.

The propylene-based resin as referred to in the resin (b) means the (co)polymers (a1) to (b3) including a propylene-derived constituent unit as a main constituent unit. Among those, the copolymer (b2) is preferred, and a propylene-ethylene copolymer is more preferred.

The ethylene-based resin as referred to in the resin (b) means the (co)polymers (a1) to (b3) including an ethylene-derived constituent unit as a main constituent unit. Among those, the copolymer (b2) is preferred, and linear low density polyethylene and linear very low density polyethylene are more preferred.

The resin (b) constituting the cover layer of the expanded beads of the present invention may further contain other resin components, additives, and the like as explained as components which the resin composition (a) may contain as long as the effects of the present invention are achieved. In consequence, the cover layer constituted of the resin (b) is not limited to one made of only the resin (b).

A content of other resin components in the cover layer is adjusted to preferably approximately 20 parts by weight or less, more preferably 15 parts by weight or less, and especially preferably 10 parts by weight or less in total based on 100 parts by weight of a sum total of the resin (b). Although the content of the additive in the cover layer varies with its addition purpose, it is adjusted to preferably 25 parts by weight or less, more preferably 20 parts by weight or less, still more preferably 15 parts by weight or less, and especially preferably 8 parts by weight or less based on 100 parts by weight of a sum total of the resin (b).

In the expanded beads of the present invention, a thickness of the cover layer is preferably 1 µm to 50 µm, more preferably 2 µm to 20 µm, and especially preferably 3 µm to 10 µm from the viewpoints of fusion bonding properties at the time of in-mold molding and mechanical physical properties of the resulting expanded beads molded article.

[Production of Expanded Beads]

As for the production method of the expanded beads of the present invention, the expanded beads may be, for example, produced by producing multi-layered resin beads having a core layer and a cover layer even in resin beads for the purpose of obtaining expanded beads and expanding the core layer in the resulting multi-layered resin beads. In this case, by making a thickness of the cover layer of the resin beads smaller than an average cell diameter of the expanded beads, the expansion of the cover layer can be suppressed in an expansion step of the multi-layered resin beads.

The multi-layered resin beads may be produced by a known method, for example, a coextrusion method as described in JP 41-16125B, JP 43-23858B, JP 44-29522B, JP 60-185816A, etc. In general, a core layer-forming extruder and a cover layer-forming extruder are used and connected with a multilayer coextrusion die. The required resins and optionally, an additive are melt kneaded by the core layer-forming extruder, and the required resins and optionally, an additive are also melt kneaded by the cover layer-forming extruder. The respective melt kneaded materials are combined within the aforementioned die to form a multi-layered structure composed of a cylindrical core layer and a cover layer covering the outer surface of the core layer, and the resultant is coextruded in a strand-like form from fine holes of a nozzle annexed in a die outlet of a tip of the extruder and then cut by a pelletizer such that the resin beads have a prescribed weight, thereby producing multi-layered resin beads.

Examples of a shape of the multi-layered resin beads which are used in the present invention include a cylindrical shape, a rugby ball-like shape, a spherical shape, and the like. The expanded beads obtained through expansion of such multi-layered resin beads become a shape approximately corresponding to the resin beads shape before the expansion, or become spherical by a known spheroidizing treatment.

An average weight per one multi-layered resin bead is preferably 0.05 mg to 10.0 mg, and especially preferably 0.1 mg to 5.0 mg. The average weight of the expanded beads may be adjusted by allowing the average weight per one resin bead for the purpose of obtaining the expanded beads to conform to an average weight per one desired expanded bead. The average weight per one expanded bead is preferably 0.05 mg to 10.0 mg, and especially preferably 0.1 mg to 5.0 mg from the viewpoint of in-mold moldability.

In the multi-layered resin beads related to the present invention, a weight ratio of the core layer and the cover layer ((core layer)/(cover layer)) is approximately 99.7/0.3 to 75/25, preferably 98/2 to 80/20, more preferably 97/3 to 85/15, and still more preferably 97/3 to 90/10.

In view of the fact that the weight ratio of the cover layer of the multi-layered resin beads falls within the foregoing range, the multi-layered resin beads expanded beads are excellent in fusion bonding properties at the time of in-mold molding, and the mechanical physical properties of the resulting expanded beads molded article become especially favorable.

The thickness of the cover layer of the multi-layered resin beads related to the present invention is preferably thinner from the viewpoint that when the multi-layered resin beads are expanded, cells may be made to be hardly produced in the cover layer, so that the mechanical physical properties of the finally obtained expanded beads molded article are enhanced. Meanwhile, it is preferred to take into consideration a lower limit of the thickness from the viewpoint of an improving effect of fusion bonding properties of the resulting expanded beads. In consequence, the thickness of the cover layer of the multi-layered resin beads is preferably 1 µm to 50 µm, more preferably 2 µm to 20 µm, and especially preferably 3 µm to 10 µm.

The thickness of the cover layer of the multi-layered resin beads is measured in the following manner. That is, the thickness is measured from a photograph taken by dividing the multi-layered resin bead into two equal parts so as to obtain a cross section, the entirety of which is surrounded by the cover layer, and enlarging the cross section under observation with a microscope such that the entirety thereof is fitted thereinto. Specifically, a straight line is drawn on the photograph such that the cross section is divided into two substantially equal parts; a straight line that intersects at right angles with the foregoing straight line and goes through a center of the resin bead; a length of each of four portions of the cover layer through which these straight lines go is determined; and an arithmetic mean thereof is defined as the thickness of the cover layer of one multi-layered resin bead. Those operations are performed on ten multi-layered resin beads as extracted at random, and a value obtained by calculating the arithmetic mean of the thickness of the cover layer of the ten multi-layered resin beads is defined as the thickness of the cover layer of the multi-layered resin beads in the present specification. The thickness of the cover layer part of the expanded bead is also measured by the same method. When the thickness of the cover layer of the multi-layered resin beads or expanded beads is hardly discriminated, the multi-layered resin beads may be produced by previously adding a coloring agent to the resin constituting the cover layer.

The expanded beads of the present invention is produced by dispersing the aforementioned multi-layered resin beads including a core layer and a cover layer in an aqueous medium (generally, water) in a pressurizable closed vessel (for example, an autoclave); adding a dispersant; putting a prescribed amount of a blowing agent thereinto under pressure; stirring the contents at a high temperature under a high pressure to impregnate the resin beads with the blowing agent; and releasing the resulting contents together with the aqueous medium from the inside of the pressure vessel into a low-pressure zone that is lower than an inside pressure of the vessel (generally under atmospheric pressure), thereby performing the expansion (this method will be hereinafter referred to as "dispersing medium releasing expansion method"). It is preferred to release the expandable beads by applying a back pressure to the inside of the vessel at this time of release. The method of obtaining the expanded beads of the present invention is not limited to the aforementioned method of expanding the multi-layered resin beads, and for example, there may be considered a method of expanding the resin beads made of, as a base material, the resin composition (a) constituting the core layer by the dispersing medium releasing expansion method to produce expanded beads and covering a resin powder made of the resin (b) on the resulting expanded beads, and so on.

In obtaining expanded beads with an especially high expansion ratio, the expanded beads with a high expansion ratio may be obtained by ageing the expanded beads obtained by the aforementioned method under atmospheric pressure in a generally adopted manner; then storing the aged expanded beads in a pressurizable closed vessel; putting a gas, such as air, etc., into the vessel under pressure to perform a pressurizing treatment, thereby performing an operation of increasing an inside pressure of the expanded beads; discharging the expanded beads from the inside of the vessel; and again expanding the discharged expanded beads upon heating with steam or hot air (this method will be hereinafter referred to as "two-stage expansion method").

The blowing agent is preferably a physical blowing agent. Although the physical blowing agent is not particularly limited, for example, organic physical blowing agents, such as aliphatic hydrocarbons, e.g., n-butane, isobutane, and a mixture thereof, n-pentane, isopentane, n-hexane, etc., and halogenated hydrocarbons, e.g., ethyl chloride, 2,3,3,3-tetrafluoro-1-propene, trans-1,3,3,3-tetrafluoro-1-propene, etc.; and inorganic physical blowing agents, such as carbon dioxide, nitrogen, air, water, etc., may be used solely or in admixture of two or more thereof. Among those blowing agents, a blowing agent containing, as a main component, an inorganic physical blowing agent, such as carbon dioxide, nitrogen, air, etc., is preferably used, and carbon dioxide is more preferably used. It is meant by the terms "containing, as a main component, an inorganic physical blowing agent" that the inorganic physical blowing agent is contained in a content of 50 mol % or more, preferably 70 mol % or more, and more preferably 90 mol % or more based on 100 mol % of the whole of the physical blowing agent. In the case of using an organic physical blowing agent or a combination of an inorganic physical blowing agent and an organic physical blowing agent, it is preferred to use n-butane, isobutane, n-pentane, or isopentane as the organic physical blowing agent from the viewpoints of compatibility with the olefin-based resin and expandability.

The addition amount of the physical blowing agent is properly selected according to the kind of the propylene-based resin, the kind of the blowing agent, the apparent density of the targeted expanded beads, and so on and cannot be unequivocally limited. However, in the case of using carbon dioxide as the physical blowing agent, its addition amount is 0.1 parts by weight to 30 parts by weight, preferably 0.5 parts by weight to 15 parts by weight, and more preferably 1 part by weight to 10 parts by weight based on 100 parts by weight of the propylene-based resin.

Examples of the dispersant include inorganic materials which are sparingly soluble in water, such as aluminum oxide, calcium tertiary phosphate, magnesium pyrophosphate, zinc oxide, kaolin, mica, etc.; water-soluble polymer-based protective colloid agents, such as polyvinylpyrrolidone, polyvinyl alcohol, methyl cellulose, etc.; and the like. Anionic surfactants, such as sodium dodecylbenzenesulfonate, a sodium alkanesulfonate, etc., and the like may also be used.

As a representative method of adjusting a high-temperature peak calorific value in the aforementioned dispersing medium releasing expansion method, in dispersing the multi-layered resin beads in an aqueous medium and heating, it is preferred that the temperature is increased to an arbitrary temperature (Ta) within a range of a temperature that is lower by 20° C. than the melting point (Tm) of the resin composition (a) (Tm−20° C.) or higher and lower than a melt completion temperature (Te); that temperature (Ta) is held for a sufficient time, preferably about 10 minutes to 60 minutes; thereafter, the resultant is heated to an arbitrary temperature (Tb) within a range of from a temperature that is lower by 15° C. than the melting point (Tm) (Tm−15° C.) to a temperature that is higher by 10° C. than the melt completion temperature (Te+10° C.); and the multi-layered resin beads are released from the inside of the closed vessel under a low pressure to achieve the expansion.

In the dispersing medium releasing expansion method, the reason why it is preferred to set up the temperatures Ta and Tb and the holding time in the aforementioned ranges resides in the matter that the size of the high-temperature peak of the expanded beads relies upon the temperature Ta on the resin beads in producing the expanded beads, the holding time at the foregoing temperature and the temperature Tb, and the heating rate.

In general, the calorific value of the high-temperature peak of the expanded beads tends to become larger as the temperature Tb is lower within the aforementioned temperature range, and the holding time at the temperature Ta is longer. The heating rate in the expansion step of 0.5° C./min to 5° C./min is usually adopted. By repeating a preliminary experiment taking into consideration these points, a production condition of the expanded beads exhibiting the desired high-temperature peak calorific value may be known easily and accurately.

The above-explained temperature adjustment range at the time of expanding the resin beads is an appropriate temperature range in the case of using the inorganic physical blowing agent as the blowing agent. In the case where the organic physical blowing agent is used in combination, each of the appropriate temperature ranges tends to be shifted to the lower temperature side than the aforementioned temperature range depending on the kind or use amount thereof due to a plasticizing effect of the organic physical blowing agent against the base resin of the resin beads.

The expanded beads of the present invention obtained by the aforementioned method has a structure in which a core layer in a foamed state having a large number of cells and a cover layer on the surface thereof are formed. An apparent density of the whole of the expanded beads of the foregoing structure is usually in the range of from 15 g/L to 300 g/L, and it is preferably 20 g/L to 150 g/L, more preferably 25 g/L to 120 g/L, and especially preferably 30 g/L to 100 g/L from the standpoint of physical properties of the resulting expanded beads molded article, and so on.

The apparent density of the expanded beads is measured in the following manner. The apparent density is determined by sinking a group of expanded beads having a weight W (g) within a graduated cylinder having water charged therein by using a wire net or the like, determining a volume V (L) of the group of expanded beads from an increase of a water level, and dividing the weight of the group of expanded beads by the volume of the group of expanded beads (W/V).

An average cell diameter of the expanded beads of the present invention is preferably 50 μm to 900 μm from the viewpoints of dimensional stability at the time of in-mold molding, mold pattern transferability, and so on. The lower limit of the average cell diameter is more preferably 80 μm, and especially preferably 100 μm from the viewpoints of dimensional stability of the resulting expanded molded article and so on. Meanwhile, the upper limit thereof is more preferably 500 μm, still more preferably 300 μm, and especially preferably 250 μm from the viewpoints of an appearance of the resulting expanded molded article and so on.

The average cell diameter of the expanded beads is measured in the following manner. That is, the average cell diameter is measured from a photograph taken by dividing the expanded bead into two equal parts to obtain a cross section and enlarging the cross section under observation with a microscope such that the entirety thereof is fitted thereinto. A straight line is drawn on the taken photograph such that the cross section is divided into two substantially equal parts; and a value obtained by dividing a length of a line segment from the periphery of the expanded bead to the opposite periphery thereof by a number of all cells intersecting with the line segment is defined as the average cell diameter of one expanded bead. Those operations are performed on twenty expanded beads as extracted at random, and a value obtained by calculating the arithmetic mean of the average cell diameters of the twenty expanded beads is defined as the average cell diameter of the expanded beads in the present specification.

<Expanded Propylene Resin Beads Molded Article>

The expanded propylene resin beads molded article of the present invention is one resulting from in-mold molding of the expanded propylene resin beads of the present invention as already described.

The production method of the expanded beads molded article resulting from in-mold molding of the expanded beads of the present invention may be produced by a known in-mold molding method.

For example, the expanded beads molded article may be produced by a cracking molding in which in order to subject the expanded beads to in-mold molding, a pair of molds for molding is used, the expanded beads are filled in the cavity of the molds under atmospheric pressure or reduced pressure and subjected to mold clamping and compressed such that the volume of the cavity of the molds is reduced by 5% by volume to 50% by volume, and subsequently, a heating medium, such as steam, etc., is fed into the inside of the molds, thereby achieving heat fusion bonding of the expanded beads (for example, JP 46-38359B). The expanded beads molded article may also be produced through molding by a pressure molding method in which the expanded beads are pressurized with a pressurized gas, such as air, etc., to increase the pressure within the expanded beads, the expanded beads are filled into the cavity of a mold under atmospheric pressure or reduced pressure and subjected to mold clamping, and subsequently, a heating medium, such as steam, etc., is fed into the mold, thereby achieving heat fusion bonding of the expanded beads (for example, JP 51-22951B) or the like. Furthermore, the expanded beads molded article may also be produced through molding by a compression filling molding method in which the expanded beads are filled into the cavity of a mold having been pressurized to above atmospheric pressure with a compressed gas while pressurizing the expanded beads to the foregoing pressure or more, and thereafter, a heating medium, such as steam, etc., is fed into the mold, thereby achieving heat fusion bonding of the expanded beads (for example, JP 4-46217B). Besides, the expanded beads molded article may also be produced through molding by an ambient pressure filling molding method in which the expanded beads are filled within a cavity of a pair of molds for molding under atmospheric pressure, and subsequently, a heating medium, such as steam, etc., is fed into the molds, thereby achieving heat fusion bonding of the expanded beads (for example, JP 6-49795B), or a combined method of the aforementioned methods (for example, JP 6-22919B), or the like.

Although a density of the expanded beads molded article which is produced through in-mold molding of the expanded beads of the present invention may be arbitrarily set up according to the purpose, it is in the range of generally from 12 g/L to 180 g/L, and preferably from 15 g/L to 75 g/L.

The density of the expanded beads molded article is calculated by dividing a weight (g) of a test piece which is cut out from the molded article by a volume (L) determined from the outside dimension of the test piece.

EXAMPLES

Next, the present invention is described in more detail by reference to Examples, but it should be construed that the present invention is not limited at all by these Examples.

Examples 1 to 5, Comparative Example 1, and Comparative Example 2

1. Selection of Low Melting Point Propylene-based Resin for Core Layer (Resin a1)
(1) Low Melting Point Propylene-based Resin 1

An ethylene-propylene random copolymer (ethylene content: 2.8% by weight, melting point: 135° C., melt flow rate:

8 g/10 min) having been polymerized in the presence of a metallocene-based polymerization catalyst was used.

(2) Low Melting Point Propylene-based Resin 2

An ethylene-propylene random copolymer (ethylene content: 2.6% by weight, melting point: 137° C., melt flow rate: 7 g/10 min) having been polymerized in the presence of a metallocene-based polymerization catalyst was used.

(3) Low Melting Point Propylene-based Resin 3

An ethylene-propylene random copolymer (ethylene content: 4.0% by weight, melting point: 138° C., melt flow rate: 8 g/10 min) having been polymerized in the presence of a Ziegler-Natta-based polymerization catalyst was used.

2. Selection of High Melting Point Propylene-based Resin for Core Layer (Resin a2)

(1) High Melting Point Propylene-based Resin 1

An ethylene-propylene random copolymer (ethylene content: 1.0% by weight, melting point: 156° C., melt flow rate: 7 g/10 min) having been polymerized in the presence of a Ziegler-Natta-based polymerization catalyst was used.

(2) High Melting Point Propylene-based Resin 2

An ethylene-propylene random copolymer (ethylene content: 1.1% by weight, melting point: 153° C., melt flow rate: 6 g/10 min) having been polymerized in the presence of a Ziegler-Natta-based polymerization catalyst was used.

(3) High Melting Point Propylene-based Resin 3

A homopropylene polymer (melting point: 163° C. melt flow rate: 20 g/10 min) having been polymerized in the presence of a Ziegler-Natta-based polymerization catalyst was used.

(4) High Melting Point Propylene-based Resin 4

An ethylene-propylene random copolymer (ethylene content: 2.2% by weight, melting point: 146° C., melt flow rate: 7 g/10 min) having been polymerized in the presence of a metallocene-based polymerization catalyst was used.

3. Selection of Olefin-based Resin for Cover Layer (1) Olefin-based Resin 1

A crystalline ethylene-propylene random copolymer (ethylene content: 3.5% by weight, melting point: 125° C., melt flow rate: 7 g/10 min) having been polymerized in the presence of a metallocene-based polymerization catalyst was used.

(2) Olefin-based Resin 2

A crystalline linear low density polyethylene polymer (melting point: 100° C., melt flow rate: 10 g/10 min) having been polymerized in the presence of a metallocene-based polymerization catalyst was used.

<Measurement Methods>

1. Melting Points of Resin and Resin Composition, and Softening Point of Resin

The melting point of each of the resin and the resin composition was measured with respect to a sample of 1 to 3 mg by means of heat flux DSC by the method described in "the case of measuring a fusion temperature after performing a certain heat treatment" in accordance with JIS K7121 (1987) by using a DSC measurement apparatus (DSC Q1000), manufactured by TA Instruments. The measurement was performed by heating from ambient temperature to 200° C. at a heating rate of 10° C./min. In addition, in the present specification, the softening point of the resin is measured on the basis of the A50 method of JIS K7206 (1999) by using a Vicat softening tester, TM4123, manufactured by Ueshima Seisakusho Co., Ltd.

2. Apparent Density of Expanded Beads

The apparent density was determined by taking out the expanded beads sample from a group of expanded beads at random, sinking the expanded beads sample having a weight W (g) in water of a 1-liter capacity graduated cylinder having water charged therein by using a wire net or the like, determining a volume V (L) of the expanded beads sample from an increase of a water level, and dividing the weight of the expanded beads sample by the volume of the expanded beads sample (W/V). The measurement was performed under atmospheric pressure at a temperature of 23° C. and at a relative humidity of 50%.

3. Density of Molded Article

The density of the expanded beads molded article was calculated by dividing a weight (g) of a test piece cut out from the molded article by a volume (L) determined from the outside dimension of the test piece. The measurement was performed under atmospheric pressure at a temperature of 23° C. and at a relative humidity of 50%.

4. Flexural Modulus of Core Layer Resin Composition (Mixed Resin)

A core resin composition (mixed resin) obtained by a method as described later was measured for the flexural modulus in accordance with JIS K7171 (2008). A tensilon universal tester, RTF-1350, manufactured by A&D Company, Limited was used as a measuring device.

5. Beads inside Pressure of Expanded Beads

The beads inside pressure of the expanded beads was calculated by reducing a weight increase of the expanded beads after pressurization with compressed air into a pressure on the basis of an equation of state for an ideal gas.

<Evaluation Methods>

1. Fusion Bonding Properties of Expanded Beads

The expanded beads molded article was bent and ruptured, and the ruptured cross section was observed. As a result, a percentage of a value obtained by dividing a number of ruptured expanded beads present on the ruptured cross section by a number of all of the expanded beads present on the ruptured cross section was defined as a material destruction rate (%) and evaluated according to the following criteria.

A: In rupturing the expanded beads molded article, the material destruction rate of the expanded beads is 70% or more.

B: In rupturing the expanded beads molded article, the material destruction rate of the expanded beads is 30% or more and less than 70%.

C: In rupturing the expanded beads molded article, the material destruction rate of the expanded beads is less than 30%.

2. Surface Smoothness of Molded Article

The surface of the expanded beads molded article was visually observed and evaluated according to the following criteria.

A: Voids among the beads or irregularities are not substantially present on the surface of the expanded beads molded article, so that a favorable surface state is exhibited.

B: Voids among the beads and/or irregularities are perceived on the surface of the expanded beads molded article to such an extent that there is no problem in view of practical use.

C: Voids among the beads and/or irregularities are remarkable on the surface of the expanded beads molded article.

3. Compression Strength of Molded Article

A test piece of 50 mm in length×50 mm in width×25 mm in thickness was cut out from the expanded beads molded article and subjected to a compression test at a compression rate of 10 mm/min in accordance with JIS K6767 (1999) to determine a 50% compression stress of the expanded beads molded article, and the evaluation was made according to the following criteria.

A: The 50% compression stress of the expanded beads molded article is 350 kPa or more.
B: The 50% compression stress of the expanded beads molded article is 300 kPa or more and less than 350 kPa.
C: The 50% compression stress of the expanded beads molded article is less than 300 kPa.

<Preparation of Core Layer Resin Composition>

The resin (a1) and the resin (a2) were melt kneaded in a mixing ratio shown in Table 1 by using a 65 mmφ single-screw extruder. The melt kneaded material was extruded in a strand-like form from fine holes of a nozzle installed in a tip of the extruder, cooled in a water tank, and then cut such that a weight of the strand was approximately 1 mg, followed by drying to obtain beads of a core layer resin composition (mixed resins 1 to 7).

(Production of Expanded Beads)

Subsequently, expanded propylene resin beads were prepared using the aforementioned multi-layered resin beads.

First of all, 1 kg of the above-obtained multi-layered resin beads were charged together with 3 L of water as a dispersing medium in a 5-liter closed vessel equipped with a stirring unit, and furthermore, 0.3 parts by weight of kaolin as a dispersant, 0.004 parts by weight of a surfactant (a trade name: Neogen S-20F, manufactured by Dai-ichi Kogyo Seiyaku Co., Ltd.; sodium alkylbenzenesulfonate) in terms of an active component amount, and carbon dioxide in the form of dry ice as a blowing agent were charged. The addition amounts (parts by weight) of the dispersant and the surfactant are amounts based on 100 parts by weight of the propylene-based resin beads.

TABLE 1

Constitution of core layer resin composition (mixed resin)

| | Resin a1 | | | Resin a2 | | | Difference in melting point between resin a2 and resin a1 ° C. | Physical properties of mixed resin | |
|---|---|---|---|---|---|---|---|---|---|
| Mixed resin No. | Kind | Melting point ° C. | Mixing ratio % by weight | Kind | Melting point ° C. | Mixing ratio % by weight | | Melting point TmA ° C. | Flexural modulus MPa |
| Mixed resin 1 | Metallocene Ethylene-propylene random copolymer | 135 | 95 | Ethylene-propylene random copolymer | 156 | 5 | 21 | 136 | 900 |
| Mixed resin 2 | Metallocene Ethylene-propylene random copolymer | 135 | 90 | Ethylene-propylene random copolymer | 156 | 10 | 21 | 138 | 920 |
| Mixed resin 3 | Metallocene Ethylene-propylene random copolymer | 137 | 97 | Ethylene-propylene random copolymer | 153 | 3 | 16 | 138 | 890 |
| Mixed resin 4 | Metallocene Ethylene-propylene random copolymer | 135 | 90 | Homopropylene | 163 | 10 | 28 | 140 | 1040 |
| Mixed resin 5 | Ethylene-propylene random copolymer | 138 | 85 | Ethylene-propylene random copolymer | 156 | 15 | 18 | 142 | 920 |
| Mixed resin 6 | Metallocene Ethylene-propylene random copolymer | 135 | 70 | Ethylene-propylene random copolymer | 156 | 30 | 21 | 145 | 1100 |
| Mixed resin 7 | Metallocene Ethylene-propylene random copolymer | 135 | 90 | Metallocene Ethylene-propylene random copolymer | 146 | 10 | 11 | 136 | 900 |

<Preparation of Expanded Propylene Resin Beads>
(Production of Multi-layered Resin Beads)

An apparatus in which a core layer-forming extruder having an inside diameter of 65 mm and a cover layer (outer layer)-forming extruder having an inside diameter of 30 mm were connected with a multilayer coextrusion die was used.

A mixed resin shown in the "Core layer" column in Table 2 was fed into the core layer-forming extruder and then melt kneaded. A resin of the kind shown in the "Cover layer" column in Table 2 was fed into the cover layer-forming extruder and then melt kneaded.

The respective melt kneaded materials were laminated and combined within the coextrusion die in a proportion in the beads shown in the "Core layer" and "Cover layer" columns in Table 2 and coextruded in a multi-layered strand-like form in which a cover layer covering the outer periphery of the core layer in an annular form from fine holes of a nozzle installed in a tip of the extruder, and subsequently, the strand was cooled with water and then cut in a weight of approximately 1.5 mg by a pelletizer, followed by drying to obtain multi-layered resin beads.

In the propylene-based resin of the core layer, zinc borate as a cell adjusting agent was blended as a master batch such that its content was 1,000 ppm by weight.

Subsequently, the temperature of the dispersing medium was increased under stirring to a temperature that is lower by 5° C. than the foaming temperature shown in Table 3, followed by holding that temperature for 15 minutes. Thereafter, the temperature was increased to the foaming temperature shown in Table 3, followed by holding that temperature for 15 minutes. Thereafter, the contents were released under atmospheric pressure while applying a back pressure of a foaming pressure shown in Table 3 by carbon dioxide, thereby obtaining expanded propylene resin beads. Various physical properties of the obtained expanded beads are shown in Table 3. The foaming pressure in Table 3 is a gauge pressure [MPa(G)].

A cross section of the expanded propylene resin bead was observed by an optical microscope. As a result, the mixed resin of the core layer was in a favorable foamed and expanded state of a closed-cell structure, whereas the olefin-based resin of the cover layer covered in a non-expanded state the core layer as shown in FIG. 4.

<Production of Expanded Propylene Resin Beads Molded Article>

An expanded beads molded article was prepared using the above-obtained expanded propylene resin beads.

First of all, the expanded beads whose beads inside pressure had been adjusted to 0.20 MPa were filled in a mold for a plank of 500 mm in length×300 mm in width×100 mm in thickness and subjected to in-mold molding by a pressure molding method using steam as a heating medium, thereby obtaining an expanded beads molded article in the form of a plank.

The heating method at the time of in-mold molding was performed as follows. Steam was fed for 5 seconds in a state of opening drain valves in the both molds to perform preheating; one-direction flow heating was performed at a pressure that is lower by 0.04 MPa(G) than the molding pressure shown in Table 3; and furthermore, reversed one-direction flow heating was performed at a pressure that is lower by 0.02 MPa(G) than the molding pressure shown in Table 3, followed by heating with steam at the molding pressure shown in Table 3 [molding vapor pressure: for example, 0.17 MPa(G) in Example 1].

After completion of the heating, the pressure was released, and cooling with water was performed until the pressure of a surface pressure gauge installed on the inner surface of the mold was reduced to 0.04 MPa(G). The mold was then opened, and the molded article was taken out therefrom. The resulting molded article was aged within an oven at 60° C. for 12 hours and then gradually cooled to obtain an expanded beads molded article. The physical properties of the resulting molded article are shown in Table 3. There was thus obtained a 100 mm-thick expanded beads molded article in the form of a plank.

An endothermic peak calorific value and a peak temperature of the endothermic peaks in the first time DSC curve of the expanded beads and the evaluation results of the expanded beads molded article are shown in Table 3.

Example 6

An expanded beads molded article was obtained in the same manner as in the foregoing Example 1, except that in the production of a expanded propylene resin beads molded article, a mold for a plank of 200 mm in length×250 mm in width×50 mm in thickness was used, and the molding pressure was changed to 0.14 MPa(G). Various physical properties of the expanded beads and the expanded beads molded article are shown in Table 3.

TABLE 2

| | | Constitution of expanded beads | | | | | |
|---|---|---|---|---|---|---|---|
| | | Cover layer | | | | Core layer | |
| | | | | | | Mixed resin | Amount in |
| | Kind of resin | Melting point TmB ° C. | Difference between TmA and TmB ° C. | Amount in beads*[1] Parts by weight | Number | Melting point TmA ° C. | beads*[1] Parts by weight |
| Example 1 | Metallocene Ethylene-propylene random copolymer | 125 | 11 | 5 | Mixed resin 1 | 136 | 95 |
| Example 2 | Metallocene Linear low density polyethylene | 100 | 38 | 15 | Mixed resin 2 | 138 | 85 |
| Example 3 | Metallocene Ethylene-propylene random copolymer | 125 | 13 | 10 | Mixed resin 3 | 138 | 90 |
| Example 4 | Metallocene Ethylene-propylene random copolymer | 125 | 15 | 5 | Mixed resin 4 | 140 | 95 |
| Example 5 | Metallocene Linear low density polyethylene | 100 | 42 | 5 | Mixed resin 5 | 142 | 95 |
| Example 6 | Metallocene Ethylene-propylene random copolymer | 125 | 11 | 5 | Mixed resin 1 | 136 | 95 |
| Comparative Example 1 | Metallocene Ethylene-propylene random copolymer | 125 | 20 | 5 | Mixed resin 6 | 145 | 95 |
| Comparative Example 2 | Metallocene Linear low density polyethylene | 100 | 36 | 5 | Mixed resin 7 | 136 | 95 |

*[1]Amount based on 100 parts by weight of a sum total of cover layer and core layer

TABLE 3

| | Foaming condition | | Expanded beads | | | | |
|---|---|---|---|---|---|---|---|
| | Foaming temperature ° C. | Foaming pressure MPa* | Apparent density g/L | Total endothermic peak calorific value** J/g | Peak top temperature of main endothermic peak** ° C. | Main endothermic peak calorific value** J/g | "Main/total" proportion** % |
| Example 1 | 142.0 | 2.8 | 80 | 66 (71) | 133 (133) | 54 (60) | 82 (85) |
| Example 2 | 141.0 | 3.2 | 80 | 55 (60) | 133 (134) | 43 (49) | 78 (82) |
| Example 3 | 142.5 | 2.8 | 80 | 68 (71) | 135 (134) | 54 (57) | 79 (80) |
| Example 4 | 145.3 | 2.7 | 80 | 70 (76) | 138 (138) | 58 (64) | 83 (84) |
| Example 5 | 144.8 | 3.0 | 80 | 68 (73) | 138 (138) | 56 (62) | 82 (85) |
| Example 6 | 142.0 | 2.8 | 80 | 66 (72) | 133 (134) | 54 (60) | 82 (83) |
| Comparative Example 1 | 154.7 | 2.0 | 80 | 94 (97) | 145 (145) | 77 (76) | 82 (78) |
| Comparative Example 2 | 144.4 | 3.0 | 80 | 66 (68) | 138 (138) | 54 (56) | 82 (82) |

| | Expanded beads Number of endothermic peaks on the high temperature side of main endothermic peak** | Molding condition Molding pressure MPa* | Evaluation of molded article | | | |
|---|---|---|---|---|---|---|
| | | | Density of molded article g/L | Fusion bonding properties | Surface smoothness | Compression strength |
| Example 1 | (1) | 0.17 | 60 | A | A | A |
| Example 2 | (1) | 0.15 | 60 | A | A | A |
| Example 3 | (1) | 0.18 | 60 | A | A | A |
| Example 4 | (2) | 0.20 | 60 | A | B | A |
| Example 5 | (1) | 0.20 | 60 | A | B | B |
| Example 6 | (1) | 0.14 | 60 | A | A | A |
| Comparative Example 1 | (1) | 0.28 | 60 | A | C | A |
| Comparative Example 2 | (1) | 0.15 | 60 | A | A | C |

(*The foaming pressure and the molding pressure are a gauge pressure.
**DSC heating condition: 10° C./min. However, the numerical values in the parentheses are a value in the case under a DSC heating condition of 2° C./min.)

In Table 3, the "main/total" proportion is a value calculated as a ratio of numerical values of the "Main endothermic peak calorific value" column and the "Total endothermic peak calorific value" column in Table 3 [{(main endothermic peak calorific value)/(total endothermic peak calorific value)}×100] as determined in the first time DSC curve obtained when the expanded beads were heated by the heat flux differential scanning calorimetry from ambient temperature to 200° C. In Examples 1 to 6, the main endothermic peak of the expanded beads exhibited the endothermic peak calorific value of 70% to 95% relative to the total endothermic peak calorific value in both of the case at a heating rate of 2° C./min and the case at a heating rate at 10° C./min, and the peak top temperature of endothermic peak was 100° C. to 140° C.

In addition, in Table 3, as for the expanded beads in the case under a heating rate of 2° C./min, the values of the total endothermic peak calorific value, the peak top temperature of main endothermic peak, the main endothermic peak calorific value, the "main/total" proportion, and the number of endothermic peaks appearing on the high temperature side of main endothermic peak are expressed in the parentheses, respectively.

It is noted from Table 3 that in the Examples, the molded articles exhibiting sufficient mechanical physical properties at a low molding pressure and having excellent surface smoothness are obtained as compared with those in the Comparative Examples.

In addition, the number of endothermic peaks appearing on the high temperature side of main endothermic peak in the heat flux differential scanning calorimetry of the expanded beads under a condition at a heating of 2° C./min is expressed in Table 3. From comparison of Examples 1 to 3 with Example 4, it is noted that the expanded beads molded article obtained from the expanded beads in which one endothermic peak appears on the high temperature side of the main endothermic peak reveals favorable evaluation results in all of physical properties of surface smoothness, fusion bonding properties, and compression strength.

The expanded beads of the present invention are excellent in fusion bonding properties among the expanded beads and are able to lower a molding pressure at the time of in-mold molding. The expanded beads molded article obtained from the foregoing expanded beads is excellent in appearance and has sufficient mechanical physical properties. The expanded beads molded article can be applied to uses of a bathtub, a water storage tank, a temporary toilet, a chair, a waterproof pan, a panel for vehicle, a vehicle body, a ship body, a float, a surfboard, a snowboard, a helmet, a watercraft, a modular bath, a container for fishery, and the like. Furthermore, the expanded beads molded article can also be utilized for new uses of a door panel for vehicle, a framework of solar power system, and the like.

REFERENCE SIGNS LIST

α: Point corresponding to 80° C. on DSC curve
β: Point corresponding to a melt completion temperature on DSC curve
γ: Point of a deepest portion of the valley between low temperature side peak and high temperature side peak
δ: Point of intersection between a straight line α-β and a perpendicular from γ
Te: Melt completion temperature
$P_1$: Main endothermic peak
$P_2$: Endothermic peak on high temperature side of main endothermic peak
Tm: Melting point
2: Core layer (expanded propylene resin beads)
4: Cover layer (expanded propylene resin beads)

The invention claimed is:

1. Expanded propylene resin beads comprising a core layer being in a foamed state and comprising a propylene-based resin composition (a) and a cover layer comprising an olefin-based resin (b),
   the propylene-based resin composition (a) satisfying the following (i) and (ii), and the olefin-based resin (b) satisfying the following (iii) or (iv):
   (i) the propylene-based resin composition (a) is a mixture of 85% by weight to 98% by weight of a propylene-based resin (a1) having a melting point of 100° C. to 140° C. and 15% by weight to 2% by weight of a propylene-based resin (a2) having a melting point of 140° C. or more and less than 165° C., provided that a sum total of the propylene-based resin (a1) and the propylene-based resin (a2) is 100% by weight;
   (ii) a difference between the melting point of the propylene-based resin (a2) and the melting point of the propylene-based resin (a1) [(melting point of a2)–(melting point of a1)] is 15° C. or more;
   (iii) the olefin-based resin (b) is a crystalline olefin-based resin having a melting point (TmB) that is lower than a melting point (TmA) of the propylene-based resin composition (a), with a difference between the melting point (TmA) and the melting point (TmB) [TmA–TmB] being more than 0° C. and 80° C. or less; and
   (iv) the olefin-based resin (b) is a non-crystalline olefin-based resin having a softening point (TsB) that is lower than the melting point (TmA) of the propylene-based resin composition (a), with a difference between the melting point (TmA) and the softening point (TsB) [TmA–TsB] being more than 0° C. and 100° C. or less,
   wherein the propylene-based resin (a1) is a propylene-based random copolymer produced in the presence of a metallocene-based polymerization catalyst, and the propylene-based resin (a2) is a propylene-based copolymer and wherein a melt flow rate range for the propylene-based resin (a1) is from 1 to 100 g/10 min. and a melt flow range for the propylene-based resin (a2) is from 6 to 20 g/10 min.

2. The expanded propylene resin beads according to claim 1, wherein in a first time DSC curve obtained by the heat flux differential scanning calorimetry when heated from ambient temperature to 200° C. at a heating rate of 2° C./min, the expanded propylene resin beads show a main endothermic peak in which a peak top temperature of the endothermic peak is 100° C. to 140° C. and one endothermic peak on the high temperature side of the main endothermic peak appears, and the main endothermic peak calorific value of 70% to 95% relative to a total endothermic peak calorific value.

3. The expanded propylene resin beads according to claim 1, wherein in the item (ii), the difference in melting point between the propylene-based resin (a2) and the propylene-based resin (a1) [(melting point of a2)–(melting point of a1)] is 15 to 25° C.

4. The expanded propylene resin beads according to claim 1, wherein the propylene-based resin (a1) and the propylene-based resin (a2) are a propylene-based resin produced in the presence of a metallocene-based polymerization catalyst.

5. The expanded propylene resin beads according to claim 1, wherein the propylene-based resin composition (a) has a flexural modulus of 800 MPa to 1,200 MPa.

6. The expanded propylene resin beads according to claim 1, wherein the propylene-based resin composition (a) has a content of the propylene-based resin (a1) of more than 90% by weight and 98% by weight or less and a content of the propylene-based resin (a2) of 2% by weight or more and less than 10% by weight.

7. The expanded propylene resin beads according to claim 1, wherein the olefin-based resin (b) is a propylene-based resin produced in the presence of a metallocene-based polymerization catalyst.

8. The expanded propylene resin beads according to claim 1, wherein the olefin-based resin (b) is an ethylene-based resin produced in the presence of a metallocene-based polymerization catalyst.

9. An expanded propylene resin beads molded article obtained through in-mold molding of the expanded propylene resin beads according to claim 1.

10. The expanded propylene resin beads according to claim 1, wherein the propylene-based resin (a1) has a melting point of 110° C. to 140° C.

11. The expanded propylene resin beads according to claim 1, wherein the propylene-based resin (a1) has a melting point of 120° C. to 140° C.

12. The expanded propylene resin beads according to claim 1, wherein the propylene-based resin (a1) has a melting point of 125° C. or more and less than 140° C.

13. The expanded propylene resin beads according to claim 1, wherein the propylene-based resin (a1) has a melting point of 130° C. or more and less than 140° C.

14. The expanded propylene resin beads according to claim 1, wherein the propylene-based resin (a1) has a melting point of 135° C. or more and less than 140° C.

15. The expanded propylene resin beads according to claim 1, wherein the propylene-based resin (a2) has a melting point of 145° C. or more and less than 165° C.

16. The expanded propylene resin beads according to claim 1, wherein the propylene-based resin (a2) has a melting point of 150° C. or more and less than 165° C.

17. The expanded propylene resin beads according to claim 1, wherein the propylene-based resin (a2) has a melting point of 150° C. to 160° C.

18. The expanded propylene resin beads according to claim 1, wherein the melt flow rate range for the propylene-based resin (a1) is from 2 to 8 g/10 min.

* * * * *